(12) United States Patent
Barrientos et al.

(10) Patent No.: US 10,937,078 B1
(45) Date of Patent: Mar. 2, 2021

(54) DYNAMIC GENERATION OF ITEM DESCRIPTION CONTENT

(71) Applicant: Amazon Technologies, inc., Seattle, WA (US)

(72) Inventors: Ivan Barrientos, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 326 days.

(21) Appl. No.: 15/885,481

(22) Filed: Jan. 31, 2018

(51) Int. Cl.
```
G06F 7/00      (2006.01)
G06Q 30/06     (2012.01)
G06N 3/02      (2006.01)
G06F 16/903    (2019.01)
```

(52) U.S. Cl.
CPC ..... *G06Q 30/0625* (2013.01); *G06Q 30/0631* (2013.01); *G06Q 30/0641* (2013.01); *G06F 16/90335* (2019.01); *G06N 3/02* (2013.01)

(58) Field of Classification Search
CPC ........... G06Q 30/0625; G06Q 30/0631; G06Q 30/0641; G06Q 30/0603; G06Q 30/0643; G06Q 30/0629; G06F 16/90335; G06F 16/955; G06F 16/9535; G06F 16/48; G06F 16/337; G06F 16/637; G06N 3/02
See application file for complete search history.

(56) References Cited

U.S. PATENT DOCUMENTS

| 10,332,053 B2 * | 6/2019 | Herman | G06Q 10/06312 |
| 2015/0186790 A1 * | 7/2015 | Ehlen | G06F 16/24578 706/52 |
| 2016/0335674 A1 * | 11/2016 | Plourde | G06Q 10/107 |

* cited by examiner

*Primary Examiner* — Azam M Cheema
(74) *Attorney, Agent, or Firm* — Knobbe, Martens, Olson & Bear, LLP

(57) ABSTRACT

A system is provided for analyzing item description attributes and user profile attributes, and dynamically generating item description content based on the analysis. The system can obtain item descriptions for a particular item from any number of different sources and/or in any number of different formats. The system can process the item descriptions to determine item attributes. The system can also obtain data regarding user profile attributes. The system may dynamically generate item description content for the particular item and user based on analyzing the item attributes and user profile attributes. The item description content may be further tailored to a particular channel of delivery.

20 Claims, 7 Drawing Sheets

DYNAMIC GENERATION OF ITEM DESCRIPTION CONTENT

BACKGROUND

Computing devices and communication networks can be used to exchange information. In a common application, a computing device can request content from another computing device via a communication network. For example, a user at a computing device, such as a personal computing device, can utilize a software browser application ("browser") or some other application to request content from a server computing device via the internet. In such scenarios, the requesting computing device can be referred to as a client computing device or user computing device. The server computing device can be referred to as a content provider.

Content providers may provide content that includes information about items, such as products or services. For example, an entity may wish to provide information about a particular item to client computing devices over the internet. The entity may generate a description of the item, and make the description available via a content provider. The content provider may then provide the description to client computing devices in response to specific requests for information about the item, in response to search queries, in response to other events, or proactively without first receiving a request.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to a system that analyzes item description attributes with respect to user profile attributes, and dynamically generates item description content based on the analysis. The system can obtain item descriptions for a particular item from any number of different sources and/or in any number of different formats. The system can process the item descriptions to determine item attributes (e.g., keywords or phrases about particular aspects of the item). The system can also obtain data regarding user interactions, profile information, and the like for a given user, and use this data to determine user attributes (e.g., keywords or phrases about items, features, or topics of interest to the user). The system may then analyze the item attributes with respect to the user attributes to determine which item attributes for the particular item are most likely to be of interest to the user. The system may dynamically generate item description content for the particular item and user based on the item attributes that are most likely to be of interest to the user. The item description content may be further tailored to a particular output domain (e.g., mode of presentation or channel of delivery) by controlling the length, tone, or other characteristics of the item description content.

Some content providers may provide information regarding items as static content. For example, a content provider may offer an item for sale on a web page, and include a description of the item for potential customers to read. The description may include information selected by the content provider for marketing purposes, technical specifications of the item, etc. In some cases, the description may exclude or ignore any perceived negative attributes of the item, or fail to include information that may be relevant to certain users. The content provider may provide the same item description to each user accessing the web page, provide the same item description to other content providers for distribution, provide a link to the web page for posting in other distribution channels, etc. However, by providing the same item description content to each user, or providing the same item description content irrespective of the mode of presentation or channel of distribution, the content may not engage users who may be interested in other aspects of the item. In addition, by providing static content, relevant new information may not be presented to potential customers in a timely manner or at all. Advantageously, a system implementing aspects of the present disclosure for dynamic generation of item description content can provide item descriptions that are automatically generated from pre-existing content regarding an item, updated as new content regarding the item is available, tailored to the interests of a particular user, tailored for presentation in a particular output domain, and otherwise automatically customized using any number of parameters.

Some aspects of the present disclosure relate to analyzing descriptions of an item to determine one or more attributes of the item. The descriptions that are analyzed may include, for example: item reviews, articles, weblog posts, microblog posts, other textual content, some combination thereof, etc. A machine learning model, such as an artificial neural network, may be trained to receive the descriptions (or data derived therefrom) and generate item attribute data that represents potential attributes of the item that are discussed in the descriptions. In some embodiments, item attribute data may represent one or more keywords or phrases indicative of one or more attributes of the item. For example, the model may generate, for a given item description (such as an article) one or more keywords or phrases that correspond to attributes of the item likely to be the most important to, or discussed most frequently or substantially in, the article text.

Additional aspects of the present disclosure relate to analyzing user profile data for a particular user to determine one or more attributes of the user. The user profile data that is analyzed may include, for example: search requests, content browse history, purchase history, demographic information, reviews or other content submitted by the user, other information, some combination thereof, etc. In some embodiments, the user profile data may be received as, or transformed into, features that may be used in subsequent processes. For example, the user profile data may represent dozens, hundreds, or thousands of features that collectively describe the user profile for a particular user and may be used to customize item description content for the user. In some embodiments, the user profile data may be received as, or transformed into, a set of keywords or phrases. For example, the user profile data for a particular user may include keywords or phrases that correspond to the items of interest to the user, features of interest to the user, prior user interactions, and the like. In some embodiments, the user profile data may be based on, or modified using, attribution data that represents content to which certain events associated with the user may be attributed. For example, user profile attributes may be modified, sorted, filtered, augmented, or otherwise processed such that the attributes most likely to correspond to desired events (e.g., item requests or purchases) may be used in subsequent processes.

Further aspects of the present disclosure relate to dynamically generating item description content based on the item attribute data and the user attribute data. In some embodiments, the system may generate candidate descriptions using the item attribute data. The candidate descriptions may be tailored for one or more specific output domains, such as item-specific web pages, articles, weblog posts, microblog posts, or the like. The candidate descriptions may be analyzed with respect to the user attribute data, and a particular candidate description may be selected for delivery or presentation. For example, the candidate description may be selected that most closely matches the user attributes based on an analysis of the coverage or overlap of item description content and user attributes. In some embodiments, the item attributes may be ranked or selected using the user attributes, and item description content or multiple candidate item descriptions may be generated from the item attributes that have been analyzed in this manner.

Although aspects of some embodiments described in the disclosure will focus, for the purpose of illustration, on particular examples of item descriptions, item attributes, user attributes, channels, models, and underlying data associations, the examples are illustrative only and are not intended to be limiting. In some embodiments, the techniques described herein may be applied to additional or alternative item descriptions, item attributes, user attributes, channels, models, and underlying data associations. As another example, some embodiments described herein relate to using particular analysis techniques and data sets, such as particular machine learning models that process particular types of input to generate particular types of output. However, in some embodiments the analysis, scoring, and/or other processing described herein may be performed using other techniques or applied to other input and/or output.

Example Dynamic Content Management System

Figure 1:
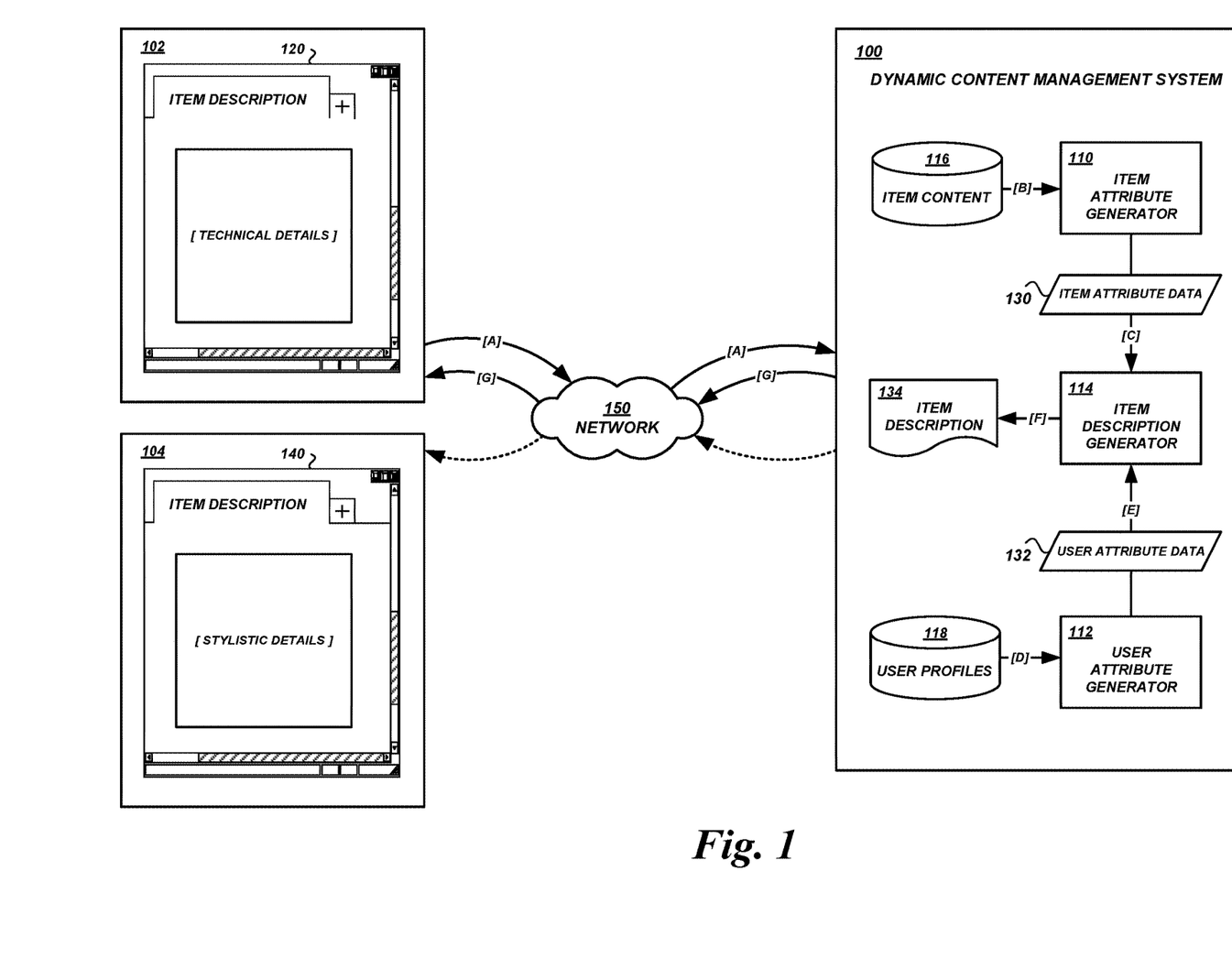
FIG. 1 is a block diagram of various data flows and interactions between a dynamic content management system and various user devices according to some embodiments.

With reference to an illustrative embodiment, FIG. 1 shows a network environment in which aspects of the present disclosure may be implemented. As shown, the network environment may include a dynamic content management system 100 and various user devices 102, 104. The dynamic content management system 100 is also referred to herein as a "content management system 100" for convenience. User devices 102, 104 may communicate with the dynamic content management system 100 and/or each other via one or more communication networks 150 (also referred to herein as "networks" for convenience). A network 150 may be a publicly-accessible network of linked networks, possibly operated by various distinct parties, such as the Internet. In some cases, the network may include a private network, personal area network, local area network, wide area network, cable network, satellite network, cellular data network, etc., or a combination thereof, some or all of which may or may not have access to and/or from the Internet.

The content management system 100 may include various components for providing the features described herein. The dynamic content management system 100 may include an item attribute generator 110 for generating or otherwise obtaining item attribute data 130. The dynamic content management system 100 may also include a user attribute generator 112 for generating or otherwise obtaining user attribute data 132. The dynamic content management system 100 may also include a dynamic description content generator 114 for dynamically generating item description content 134 from item attribute data 130, user attribute data 132, other data, some combination thereof, etc. The dynamic description content generator 114 is also referred to herein as a "description generator 114" for convenience.

The content management system 100 may also include one or more data stores for storing information used by, or generated by, various subsystems of the dynamic content management system 100. For example, an item content data store 116 may store documents that describe items, textual item descriptions extracted from documents, etc. The dynamic content management system 100 may also include a user profile data store 118 to store user profile data such as information about prior user interactions with content, data regarding user demographics and preferences, and the like.

The example subsystems and data stores of the content management system 100 shown in FIG. 1 are illustrative only, and are not intended to be limiting. In some embodiments, a content management system 100 may have fewer, additional, and/or alternative subsystems and data stores.

The content management system 100 may be implemented on one or more physical server computing devices that provide computing services and resources to user devices 102, 104. In some embodiments, the content management system 100 (or individual components thereof, such as the item attribute generator 110, user attribute generator 112, dynamic description content generator 114, etc.) may be implemented on one or more host devices, such as blade servers, midrange computing devices, mainframe computers, desktop computers, or any other computing device configured to provide computing services and resources. For example, a single host device may execute one or more item attribute generators 110, user attribute generators 112, dynamic description content generators 114, item content data stores 116, user profile data stores 118, some combination thereof, etc. The dynamic content management system 100 may include any number of such hosts.

In some embodiments, the features and services provided by the dynamic content management system 100 may be implemented as web services consumable via one or more communication networks. In further embodiments, the dynamic content management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual user devices 102, 104 may be any of a wide variety of electronic communication devices, including telephones, tablet computing devices, electronic reader devices, wearable computing devices, mobile devices (e.g., cellular and other mobile phones, smart phones, media players, handheld gaming devices, etc.), personal computing devices, terminal computing devices, laptop computing devices, desktop computing devices, set-top boxes, streaming media devices, smart home appliances, and various other electronic devices and appliances.

As shown in FIG. 1, a user may use a user device 102 to request content from the content management system 100 at [A]. In one specific non-limiting example, the request may be a request initiated using a browser or other application executing on the user device 102, and transmitted using the Hypertext Transfer Protocol ("HTTP") via the internet to the content management system 100. The request may be a request for a content page, such as a web page, that will include information regarding an item. In some embodiments, the request may be a request for other content, such as social network content, blog content, content to be displayed within a specialized application executing on the user device 102 (rather than a general web browser), etc.

The content management system 100 may receive the request and, in response, dynamically generate a description of the item tailored for the specific user from whom the request originated, tailored for the specific output domain in which the description is to be presented (e.g., item detail web page, weblog, microblog, etc.), and/or tailored to other context-dependent or otherwise dynamically-determined parameters. In some embodiments, the content management system 100 may access and provide a previously-generated description of the item that has been tailored for this user, output domain, etc.

To generate the description, the item attribute generator 110 may obtain, at [B], pre-existing descriptions of the item associated with the request or other content that relates to the item. The pre-existing descriptions can serve as source material from which the dynamic item description generator 114 may dynamically generate a description of the item. The pre-existing descriptions may include reviews generated by other users of the content management system 100, reviews otherwise accessible to the content management system 100, weblog posts, articles, microblog posts, social media posts, or other forms of content that include textual descriptions of items or from which textual descriptions of items may be derived. The pre-existing descriptions may be accessed from the item content data store 116 and/or other data stores accessible to the item attribute generator 110, such as network-accessible content servers, web sites, content delivery networks, and the like.

The item attribute generator 110 may analyze the pre-existing item description content and generate item attribute data 130 at [C]. Item attribute data 130 may include keywords, phrases, concepts, and/or other information that has been identified by analyzing one or more pre-existing descriptions of the item. In some embodiments, the item attribute data 130 may represent the keywords, phrases, concepts, and the like that occur most frequently in—and/or are associated with the greatest volume of—the pre-existing description content. The generation of item attribute data 130 from item description content is described in greater detail below.

The user attribute generator 112 may obtain, at [D], user profile data from the user profile data store 118 and/or other data stores accessible to the user attribute generator 112. The user profile data may be associated with the user from whom the request for the item description content originated. In some embodiments, the user profile data may be associated with the user and one or more other users who have been identified as similar users from the standpoint of user profile data (e.g., the users belong to the same segment, cluster, cohort, or other grouping of users determined to be similar in some way). The user profile data may include data regarding prior interactions of the user with other content provided by the content management system 100 or some other system, content generated or submitted by the user, search queries submitted by the user, purchases by the user, etc.

The user attribute generator 112 may analyze the user profile data and generate user attribute data 132 at [E]. User attribute data 132 may represent keywords, phrases, concepts, and/or other attributes that have been identified by analyzing the user profile data. In some embodiments, the user attribute data 132 may represent the keywords, phrases, concepts, and the like that occur most frequently in and/or are associated with the greatest volume of user profile data, or content associated with items of user profile data. For example, the user attribute generator 112 may obtain user profile data regarding items purchased by the user. The user attribute generator 112 may also obtain content that the user accessed prior to—or substantially concurrently with—purchasing the items. Keywords may then be identified by analyzing the content that the user accessed. In some embodiments, the keywords associated with the items that were purchased after viewing the content may be given more weight in subsequent processing if those keywords also occur in content that the user accessed prior to or concurrently with purchasing the item. The generation of user attribute data 132 from user profile data and/or related content is described in greater detail below.

The description generator 114 may generate, at [F], one or more descriptions 134 of the current item using the item attribute data 130 and user attribute data 132. In some embodiments, the description generator 114 may generate one or more candidate item descriptions using item attribute data 130. For example, description generator 114 may use a natural language generation subsystem to transform item attribute data 130 (which may be in the form of keywords, phrases, etc.) into phrases, bullet points, sentences, paragraphs, or other presentations of content. Illustratively, the specific form that the candidate descriptions take may be based on domain parameters for the output domain in which the generated item description is to be presented, such as an item detail page that includes a large amount of other information about the item, a blog post, a full article, a sentence fragment for distribution as a microblog post, etc. The description generator 114 can analyze the candidate description(s) with respect to the user attribute data 132 and select the item description 134 that most closely corresponds to the user profile of the user to whom the item description 134 is to be presented. In some embodiments, the description generator 114 may select the item attributes that most closely correspond to the user profile data, and then generate the item description 134 from the selected item attribute(s) based on the output domain parameters. The dynamic generation of item description content is described in greater detail below.

The dynamically generated item description content 134 may be provided to the requesting user device 102 at [G]. In the example illustrated in FIG. 1, the item description content 134 is presented by the user device 102 within a browser interface 120. The item description content 134 includes content regarding the technical features of a particular item (e.g., speakers). Illustratively, the item description content 134 displayed by the user device 102 focuses on the technical details of the item because the user profile associated with the user of the user device 102 indicates that the user is generally interested in technical details rather than, e.g., stylistic details, reliability details, etc. Moreover, the specific technical details that are presented can be tailored to the user rather than simply displaying any technical details. For example, the user of the user device 102 may be most interested in metrics related to acoustic output, details about wireless capabilities of the speaker, and the like.

FIG. 1 also shows an example of item description content 134 generated for, and provided to, a second user device 104. The item description content 134 provided to the second user device 104 may be a description of the same item as the item description content provided to the user device 102 (e.g., a description of wireless speakers). However, the user of the second user device 104 may have different interests, perform different interactions, access different content, and otherwise cause generation of different user profile data than the user of the first user device 102. Therefore, the user attribute generator 112 may access different user profile data and generate different user attribute data 132 for the user of the second user device 104 than the user of the first user device 102. For example, the user of the second user device 104 may browse content related to the way items look, may submit reviews focusing on the style of items, etc. Therefore, the dynamic item description generator 114 may obtain user attribute data 132 that indicates the user's interest in stylistic aspects of items, and generate item description content 134 focusing on the stylistic aspects. As shown, the item description content 134 may be presented by the user device 104 within a browser interface 140, and may include descriptions of stylistic features of speakers in this example.

Figure 2:
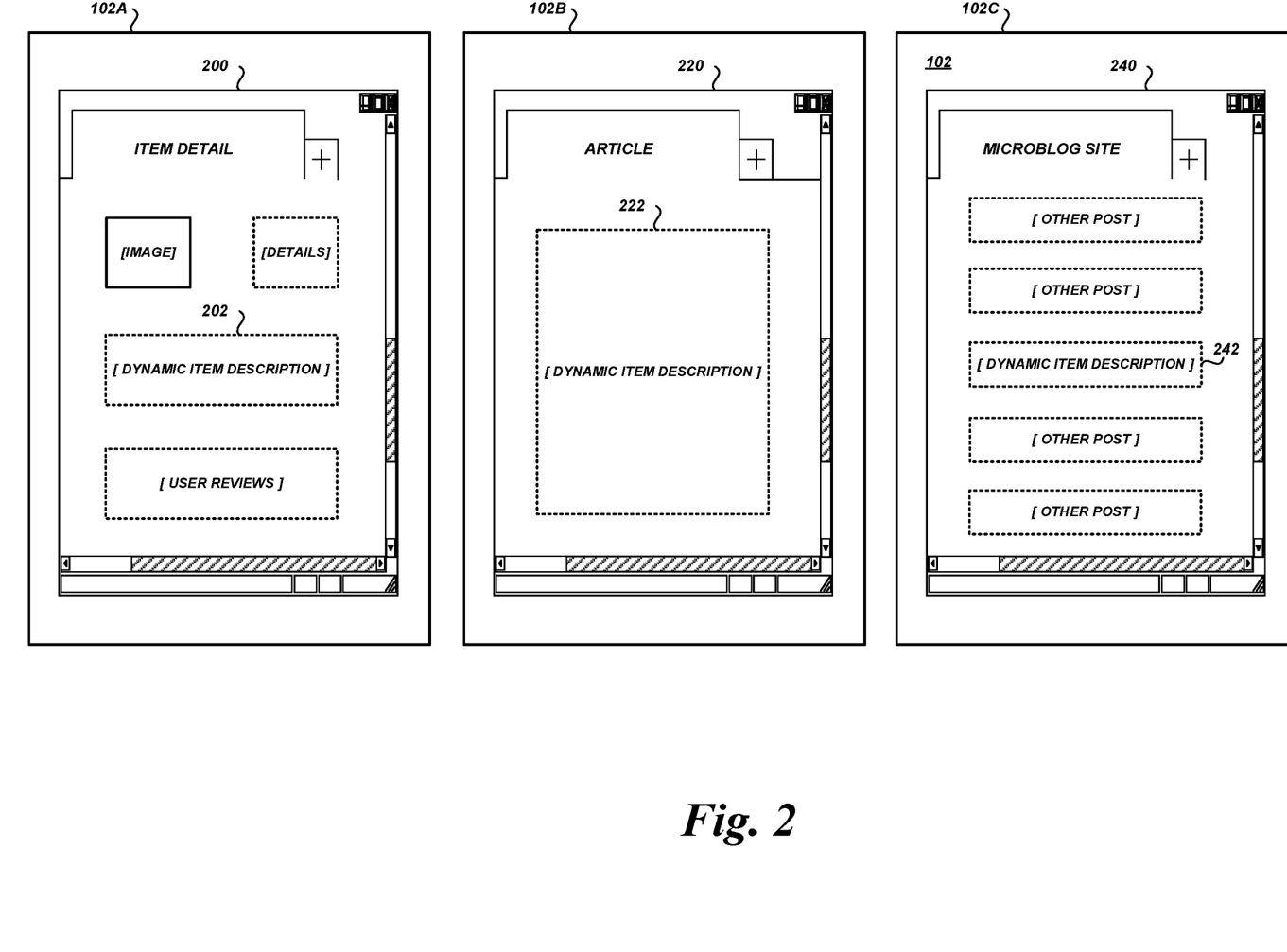
FIG. 2 is a block diagram of various data flows and interactions between a dynamic content management system and a user device according to some embodiments.

FIG. 2 shows examples of item description content generated for presentation in a variety of different output domains. The same user may request the item description content for the same item shown in each of the examples, and therefore the item description generator 114 may use the same (or similar) user attribute data 132 and the same (or similar) item attribute data 130 to generate the item descriptions shown in each of the examples. However, because each item description is presented in a different output domain, the descriptions may take different forms.

User device 102a is shown presenting an item detail page 200 for a set of headphones. The item detail page 200 in this example is a web page that provides a variety of information about the item, including images, manufacturer-supplied details, user reviews, and the like. In addition, a section 202 for dynamically generated item description content is included. Because only the small section 202 of the otherwise large item detail page 200 is available for dynamically generated item description content, the content that is generated by the description generator 114 is in the form of several concise bullet points. The bullet points focus on technical features of the headphones due to the user attribute data representing the user's interest in technical features.

User device 102b is shown presenting an article 220 about the set of headphones. The article in this example focuses on the set of headphones, and a large section 222 of the article 220 (or substantially the entire article) is dynamically generated by the description generator 114. As with the item detail page 200 described above, the article 220 focuses on technical features of the headphones because the user attribute data represents the user's interest in technical features. However, due to the characteristics of the particular output domain (e.g., large available area mostly or completely available for dynamically generated content), the description generator 114 has generated a larger amount of textual description, formatted as prose for display as an article, and covering a larger number of technical features than the item description content provided for the section 202 of the item detail page 200.

User device 102c is shown presenting a microblog post 240 about the set of headphones. The microblog post in this example focuses on the set of headphones, and includes only a small section 242 (which corresponds to most or all of the microblog post) that is dynamically generated by the description generator 114. As with the item detail page 200 and article 220 described above, the microblog post 240 focuses on technical features of the headphones due to the user attribute data representing the user's interest in technical features. However, due to the characteristics of the particular output domain (e.g., very small available section 242), the item description generator 114 has generated a single sentence about a single technical detail.

The example dynamically generated item descriptions, output domains, item attributes, user attributes, and processing components shown and described herein are illustrative only, and are not intended to be limiting. In some embodiments, the content management system 100 may dynamically generate different types of descriptions, tailored for different output domains, and tailored for different user attributes than those shown and described herein.

Example Process for Generating Item Description Content

Figure 3:
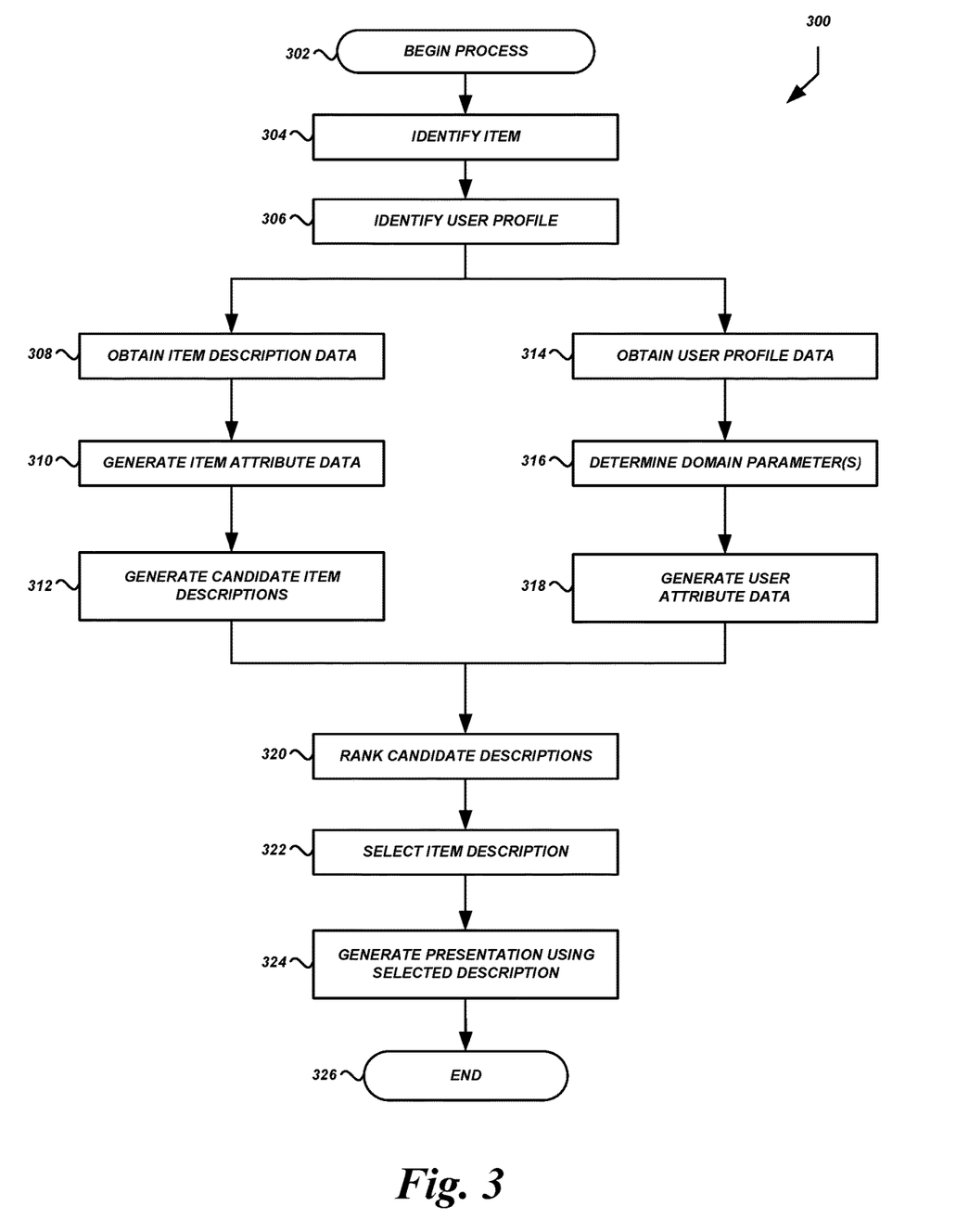
FIG. 3 is a flow diagram of an illustrative process for generating dynamic item description content according to some embodiments.

FIG. 3 is a flow diagram of an illustrative process 300 that may be executed by a content management system 100 to dynamically generate description content tailored for the attributes of a particular user and/or output domain. Portions of the process 300 will be described with reference to the example item attribute generator 110 and item description generator 114 shown in FIG. 4, the example user attribute generator 112 shown in FIG. 5, and the example analysis shown in FIG. 6. However, the example subsystems and analyses shown and described are illustrative only, and are not intended to be limiting.

The process 300 shown in FIG. 3 begins at block 302. The process 300 may begin in response to an event, such as when the content management system 100 begins operation, or receives a request for item description content regarding a particular item. When the process 300 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 700 shown in FIG. 7 and described in greater detail below. For example, executable instructions for implementing the functionality of the item attribute generator 110, user attribute generator 112, and/or item description generator 114 may be loaded into memory and executed by a processor. In some embodiments, the process 300 or portions thereof may be implemented on multiple processors of a single computing device 700 or multiple computing devices 700, serially or in parallel.

At block 304, the content management system 100 can identify an item for which a description is to be dynamically generated. The item may be identified by item identifier data that is included in a request for item description content. For example, a user may request a network resource (e.g., a document, web page, or data feed) that is to provide a description of the item. The request itself may include item identifier data (e.g., embedded in a uniform resource locator or "URL" that was accessed, included in an HTTP header, etc.), or the content management system 100 may determine which item the request corresponds to after submission of the request. In some embodiments, the process 300 may not be performed in response to a request for content regarding a specific item. For example, the process 300 may be performed asynchronously or "offline" to generate the content to be provided later. In such cases, the item for which description content is to be dynamically generated may be provided or accessed in the form of a list of items or in some other manner.

At block 306, the content management system 100 can identify a user profile to which the item description is to be tailored. The user profile may be associated with a user from whom a request for the item description originated, and may be identified by user profile identifier data. For example, a request sent by a user device 102 (e.g., for a document, web page, or data feed regarding the item) may include user profile identifier data (e.g., embedded in a URL that was accessed, included in an HTTP header, etc.), or the content management system 100 may determine which user profile corresponds to the request after submission of the request. In some embodiments, the process 300 may not be performed in response to a request or content regarding a specific item. For example, the process 300 may be performed asynchronously or "offline" with respect to provide item description content to user devices. In such cases, the user profile for which description content is to be tailored may be provided or accessed in the form of a list of user profiles or in some other manner.

At block 308, the item attribute generator 110 or some other module or component of the content management system 100 can obtain the source material from which an item description may be dynamically generated. The source material may include pre-existing textual descriptions of the item, or textual content that is otherwise associated with the item. For example, the source material may come from reviews of the item submitted to the content management system 100 by other users or otherwise accessible by the content management system 100. The source material may additionally or alternatively include content of other types or formats, or from other sources. For example, the source material may include articles, social media posts, weblog posts, microblog posts, specification documents, other types of documents or files, some combination thereof, etc. In some embodiments, the item attribute generator 110 may use item identifier data (e.g., as determined above) to access pre-existing textual descriptions of the item from the item content data store 116.

Figure 4:
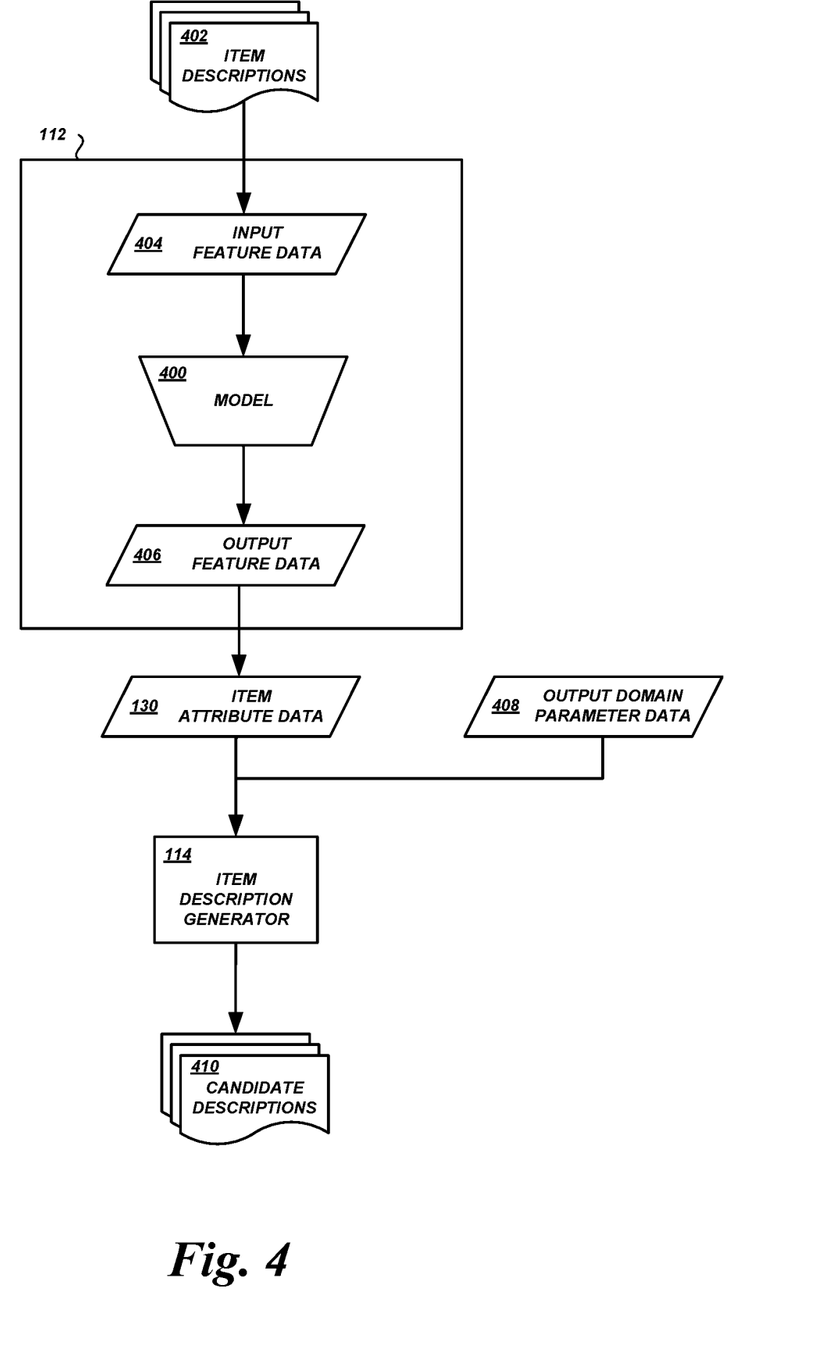
FIG. 4 is a block diagram illustrating generation of item attributes and candidate item descriptions according to some embodiments.

At block 310, the item attribute generator 110 or some other module or component of the content management system 100 can generate one or more item attributes from the source material (e.g., pre-existing textual descriptions) obtained above. FIG. 4 shows an illustrative item attribute generator 110 that generates item attribute data 130.

As shown in FIG. 4, the item attribute generator 110 may include a model 400, such as an artificial neural network, to process input textual descriptions 402 and generate item attribute data 130 from which a new textual description may be dynamically generated. The input textual descriptions 402 may be or include the pre-existing textual descriptions obtained as described above, or text derived therefrom. For example, the item attribute generator 110 (or some other module or component of the content management system 100) may perform pre-processing on the input textual descriptions 402 to put the source material into a form better suited for item attribute generation. Illustratively, the pre-processing may include extracting text from documents, tokenizing the text, normalizing the text, lemmatizing the text, some combination thereof, etc.

The item attribute generator 110 may generate input feature data 404 using the pre-processed input textual descriptions 402 (or unprocessed input textual descriptions 402) that can be processed using the model 400. In some embodiments, the item attribute generator 110 may generate numeric representations of the textual descriptions so that the model 400 can perform calculations on the input feature data 404. For example, the item attribute generator 110 may embed, in the input feature data 404, encoded representations of the input textual descriptions 402, such as pre-trained word embeddings, strings of Unicode or ASCII indices, and the like.

In some embodiments, the input feature data 404 may be generated in the form of one or more feature vectors. A single feature vector may include data representing a single input textual description 402, or may include data representing multiple input textual descriptions 402. In some embodiments, the input feature data 404 may include multiple feature vectors in the form of a matrix or tensor. For example, a single feature vector may represent a single input textual description 402 or a portion thereof (e.g., fixed-length data representing a portion of an input textual description 402), and collectively the matrix or tensor may represent an input textual description 402 or multiple textual descriptions.

The item attribute generator 110 may generate item attribute data 130 by processing the input feature data 404 using the model 400. The model 400 may be (or include) a machine learning model, statistical model, probabilistic logic network, set of rules, some combination thereof, etc. In one specific non-limiting embodiment, the model 400 is (or includes) an artificial neural network, such as a deep neural network ("DNN"), convolutional neural network ("CNN"), recurrent neural network ("RNN"), or the like. The neural-network-based model 400 may be trained to generate short summarizations, phrases, keywords, etc. that represent the content of the input feature data 404. For example, the model 400 may be trained to identify one or more phrases (e.g., collections of one or more words) that appear in the input feature data 404 (and therefore in one or more input textual descriptions 402). As another example, the model 400 may be trained to identify one or more phrases that represent a concept to which a largest portion of the input feature data 404 relates.

Illustratively, the model 400 may be trained to assign a floating point number between zero and one to each distinct word (or n-gram, such as a bigram) in an input text. The collection of these floating point numbers may represent a probability distribution of the input text's distinct words (or n-grams). An individual floating point number may numerically encode the frequency and/or importance of a given word (or n-gram) as a single value. In some embodiments, the collection of floating point numbers is represented by an array whose values sum to a predetermined or dynamically determined value (e.g., the values sum to 1).

The training of the model 400 may involve inputting a corpus of text including one or more documents (e.g., dozens, hundreds, thousands, or more), from which input feature data 404 (e.g., individual words or n-grams in the corpus, representations thereof, etc.) may be generated. The corpus may be considered as a single input, or individual documents may be processed separately. The documents chosen for training an item-specific model (or category-specific model for a group of items sharing a common attribute) may be chosen based on an association of the documents to the category to which the item belongs. Illustratively, if a model 400 for wireless speakers is being trained, then documents relating to wireless speakers may be obtained and combined into an input text. The model 400 is then used to output a collection of floating point numbers for distinct words (or n-grams) of the input text, representing the absolute or relative frequency and/or importance of the individual distinct words (or n-grams). In one specific, non-limiting example, the input feature data 404 may represent a corpus of documents (e.g., reviews, articles, etc.) regarding wireless speakers. The model 400 may process the input feature data 404 by performing a forward pass in which elements of input feature data 404 are multiplied by a set of trained weights, the results are used to compute activation function values, and these operations may be repeated as needed depending upon the size and structure of the model 400 and/or input feature data 404. The output of the forward pass may be the collection of floating point values representing the frequency and/or importance of the distinct words of the corpus.

The collection of floating point numbers generated for a particular category or other corpus of documents may be stored for use in analyzing documents for a specific item (e.g., one or more reviews for a specific wireless speaker) and identifying one or more item attributes for the specific item. Illustratively, distinct words in reviews for a specific wireless speaker can be analyzed using the collection of floating point values representing the probability distribution determined for the "wireless speakers" category. The most relevant words from the reviews may be the words corresponding to the greatest floating point values, thus corresponding to the individual words considered to be the most frequent or important when describing wireless speakers. These words may be identified in the output feature data 406. For example, a review may make two primary points: (1) the wireless speaker is energy efficient, and (2) the wireless speaker provides high-quality sound output article. The output feature data 406 may be encoded representations of words or phrases (e.g., n-grams) indicative of the energy efficiency of the speaker, the high-quality sound of the speaker, other attributes of the speaker, some combination thereof, etc. If needed, the output feature data 406 may then be transformed to obtain the item attribute data 130. The item attribute generator 110 may repeat process of generating input feature data 404, output feature data 406, item attribute data 130, and the like as needed, depending upon the number of input textual descriptions 402, the structure and/or functionality of the model 400, the current parameters of the item attribute generator 110, etc.

Returning to FIG. 3, at block 312 the description generator 114 may generate one or more candidate descriptions of the item. The candidate description(s) may be generated using the item attribute data 130. In some embodiments, the candidate description(s) may be generated specifically for— or otherwise based on parameters associated with—a particular output domain. For example, the item description may be being generated in response to a request for an item detail page that has a small portion available for a dynamically generated item description. The description generator 114 may generate one or more candidate descriptions that conform to the parameters of this particular output domain, which may be different than the candidate descriptions generated for a different output domain (even though the descriptions may be of the same item, tailored for the same user, etc.). FIG. 4 shows an illustrative description generator 114 that generates one or more candidate descriptions 410.

As shown in FIG. 4, the description generator 114 may receive, as input, item attribute data 130 and generate, as output, one or more candidate descriptions 410 of the item. The description generator 114 may use a natural language generation subsystem to generate text that appears natural to readers (e.g., the text includes fully-formed sentences or otherwise conforms to standard rules of grammar or stylistic norms such that it appears natural to readers). Illustratively, the natural language generation subsystem may take the item attribute data 130, which may be in the form of keywords or phrases, and generate candidate descriptions 410.

In some embodiments, the description generator 114 may generate candidate descriptions 410 according to one or more output-domain-specific parameters 408. For example, depending upon the target output domain, the description generator 114 may generate candidate descriptions 410 of a minimum, maximum, or target length (e.g., based on the number of characters, words, sentences, paragraphs, or other measurements of text). As another example, the description generator 114 may generate candidate descriptions 410 with a minimum, maximum, or target number of concepts or attributes. The description generator 114 may generate candidate descriptions 410 according to individual parameters or combinations thereof.

The output domain for which the candidate descriptions 410 are being generated may be determined in various ways. For example, the request for which the item description is being dynamically generated may be associated with a particular request, as described above. As another example, the process 300 may be performed in an asynchronous, offline, or batch mode in which a set of item descriptions are generated for one or more output domains. As yet another example, user profile data may affect the output domain (or output domain parameters) to which an item description is tailored. Illustratively, a target output domain may be determined during processing of user profile data, described below. The target domain may be determined based on the output domains which the user has recently and/or predominately accessed, the domains to which the user has recently and/or predominantly posted content, the output domains for content to which certain user events (e.g., purchases) may be recently or predominantly attributed, some combination thereof, etc.

Returning to FIG. 3, at block 314 the user attribute generator 112 can obtain user profile data that serves as the source data from which user attribute data 132 is generated. The user attribute generator 112 may use user identifier data (e.g., as determined above) to access the user profile data from the user profile data store 118. Illustratively, the user profile data may include search requests, content browse history, purchase history, demographic information, reviews or other content submitted by the user, other information, some combination thereof, etc. In some embodiments, the user profile data may be received as, or transformed into, features that may be used in subsequent processes. For example, the user profile data may represent dozens, hundreds, or thousands of features that collectively describe the user profile for a particular user and may be used to customize item description content for the user.

At block 316, the user attribute generator 112 can determine output domain parameters. For example, the user attribute generator 112 can determine output domain parameters as described in greater detail above.

Figure 5:
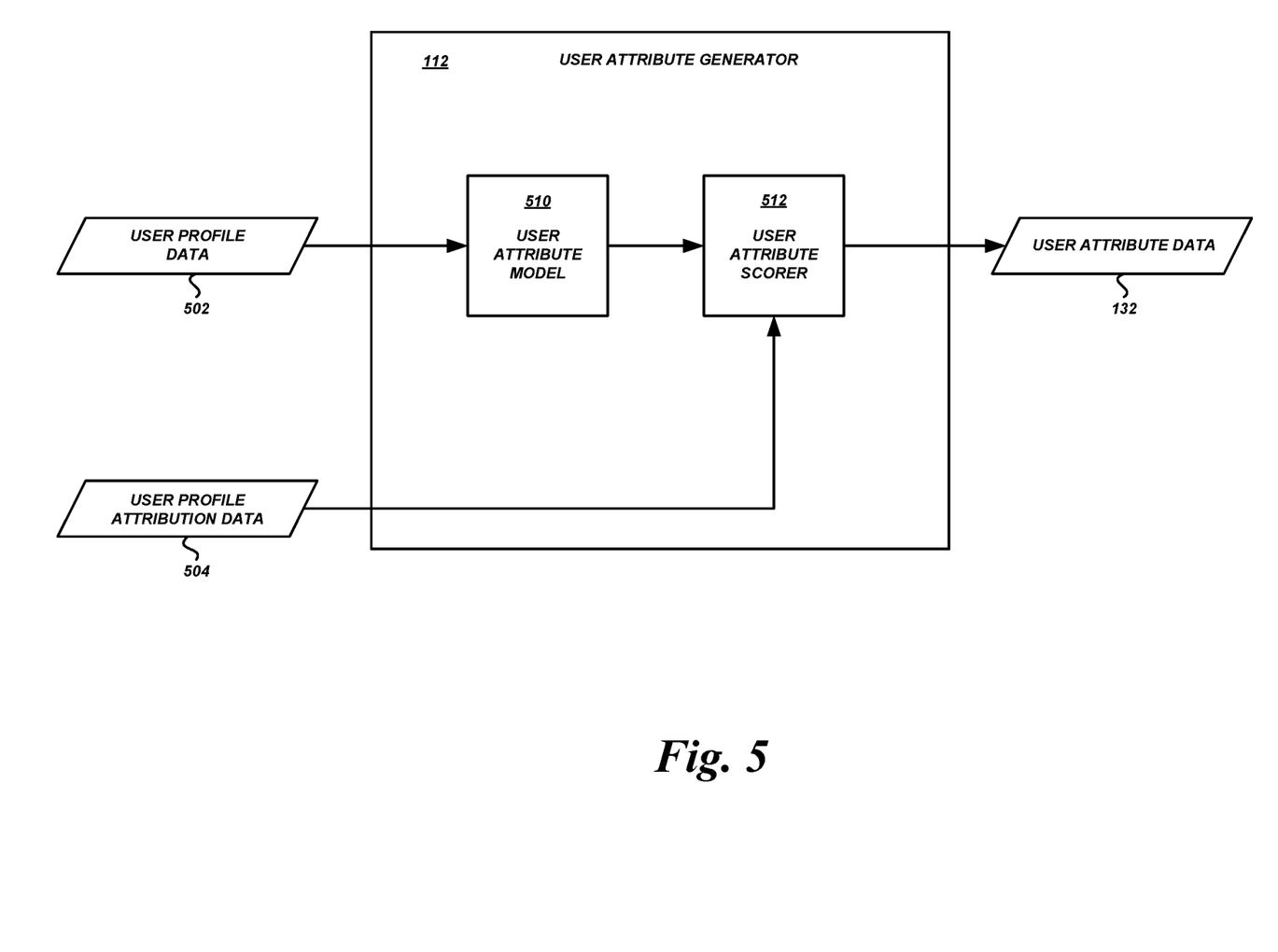
FIG. 5 is a block diagram illustrating determination of user attributes according to some embodiments.

At block 318, the user attribute generator can generate user attribute data 132 from user profile data obtained above and/or other data. FIG. 5 shows an illustrative user attribute generator 112 that generates user attribute data 132.

As shown in FIG. 5, the user attribute generator 112 may receive, as input, user profile data 502 and generate, as output, user attribute data 132. In some embodiments, the user attribute generator 112 may analyze the user profile data 502 using a user attribute model 510, such as a machine learning model, statistical model, or set of rules. The model 510 may be trained to correlate user profile data (e.g., representing prior user interactions, events, generated content, demographic characteristics, etc.) to user attributes.

In one specific, non-limiting example, the user profile data 502 may be obtained from a data store, such as the user profiles data store 118, at the time of execution of block 318. User profile data obtained from the data store 118 may include, for example: records of a user's most recently completed transactions; records of a user's likelihood of purchasing items in a particular product category, or likelihoods for each of multiple different categories; words submitted in recent search requests by the user (e.g., search queries for items with particular technical capabilities); reviews generated by the user (e.g., reviews expressing positive or negative sentiments about particular technical capabilities); reviews recently read by the user; and the like. The model 510 may be trained to generate, as output, user attribute data 132 representing or otherwise corresponding to particular keywords or phrases associated with the user profile data (e.g., "wireless speakers," "high-quality audio", etc.).

In some embodiments, as shown, the user attribute generator 112 may also receive user profile attribution data 504 as input. The user profile attribution data 504 may represent content to which certain events associated with the user profile may be attributed. For example, the documents or other content that a user has viewed prior to or substantially concurrently with performing certain events of interest (e.g., item requests or purchases) may be considered to have played a role in the events. Thus, the events may be attributed to some degree to those documents or other content. Such documents may be referred to as attribution documents, and the corpus of content to which the events may be attributed may be referred to as attribution content. The user attribute generator 112 may use a user attribute scorer 512 to analyze the user attribute data 132 with respect to the user profile attribution data 504. For example, the user profile attribution data 504 may represent keywords or phrases, and corresponding weights or other factors by which user attributes that correspond to the keywords or phrases may be adjusted. Illustratively, the user attribute generator 112 may be configured to generate a listing of the N most important or highest scoring user attributes (where N is some number, such as 10). The user attribute scorer 512 may re-score previously-generated scores for user attributes based on the degree to which the user attributes correspond to user profile attribution data 504. In some embodiments, the user attribute scorer 512 may select or generate the original scores for user attributes based on the degree to which the user attributes correspond to the user profile attribution data 504, and no re-ranking or re-scoring may be necessary.

Figure 6:
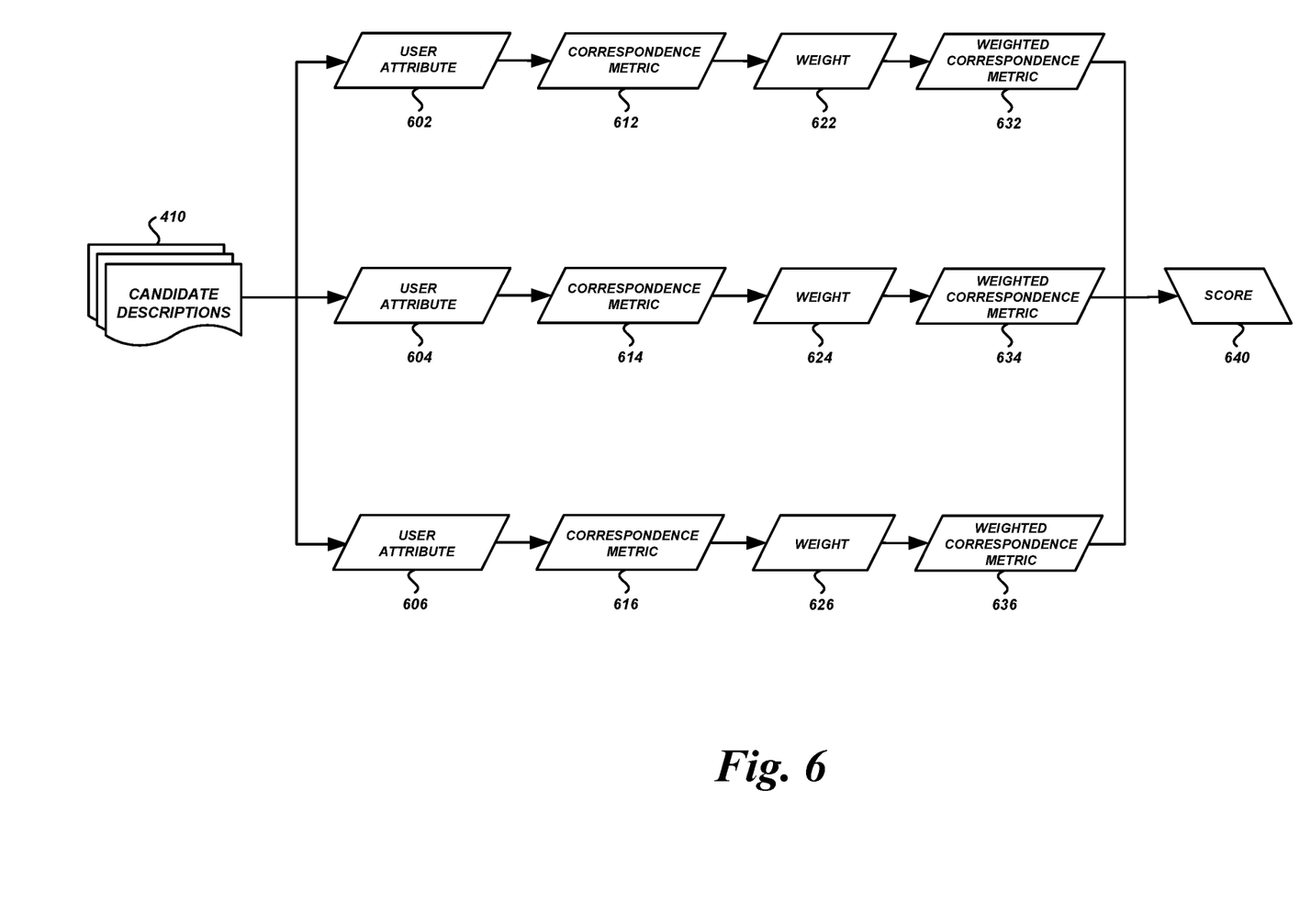
FIG. 6 is a block diagram illustrating selection of dynamically generated item descriptions according to some embodiments.

At block 320, the description generator 114 may rank the candidate descriptions generated above. The description generator 114 may rank the candidate descriptions based upon a degree to which individual descriptions correspond to the user attribute data 132. FIG. 6 shows an example process by which the description generator 114 can determine the degree to which candidate descriptions correspond to user attribute data 132.

As shown in FIG. 6, a candidate description 410 may be analyzed with respect to one or more user attributes 602, 604, 606. In some embodiments, the description generator 114 may compare text data from the candidate description 410 to text data from (or associated with) each of the user attributes represented by the user attribute data 132: user attribute 602, user attribute 604, and user attribute 606 in this example. A correspondence metric 612, 614, 616 may be generated, representing the degree to which the candidate description 410 corresponds to the user attributes 602, 604, 606, respectively. For example, a correspondence metric 612 may represent the percentage of words or phrases in the candidate description 410 that are also in (or otherwise correspond to) words or phrases of a user attribute 602, or vice versa. As another example, a correspondence metric 614 may represent a degree of semantic similarity between the candidate description 410 and a user attribute 604. Illustratively, the degree of semantic similarity may be determined based on the cosine distance between representations of the candidate description 410 (or a portion thereof) and the user attribute 604 (or data associated therewith). The example methods of determining correspondence between the candidate description 410 and various user attributes 602, 604, 606 are illustrative only, and are not intended to be limiting. In some embodiments, additional or alternative methods may be used alone or in combination with those described herein.

The description generator 114 can apply weighing factors to the correspondence metrics based on, e.g., the relative ranking of the various user attributes with respect to each other. For example, some user attributes may be considered more important or otherwise deserving of more weight than other user attributes. In some embodiments the individual attributes 602, 604, 606 may be associated with corresponding weights 622, 624, 626, respectively, that indicate the relative ranking of the user attributes 602, 604, 606. The weights 622, 624, 626 may be applied to the correspondence metrics 612, 614, 616 to generate weighted correspondence metrics 632, 634, 636, respectively. The description generator 114 may combine the weighted correspondence metrics 632, 634, 636 (or some subset thereof) to determine a score 640 for the candidate description 410. This process may be repeated for each remaining candidate description 410, or some subset thereof, in order to generate scores 640 that can be used to determine which candidate description 410 to use as the dynamically generated description for this item, user, and output domain.

At block 322, the description generator 114 can select a candidate description 410 for the particular item, particular user, and/or particular output domain. For example, the description generator 114 may select the candidate description 410 with the highest score 640.

At block 324, the content management system 100 can generate a presentation using the selected candidate description 410. For example, if the content that has been requested (or is otherwise to be provided) is an item detail page with a section for a dynamically generated item description, the content management system 100 can add the selected description to the item detail page at the appropriate location.

The process 300 may terminate at block 326. In some embodiments, certain blocks of the process 300 may be performed in a different order than shown and described, some blocks may be performed in parallel or asynchronously, some blocks may be omitted or repeated, additional blocks may be performed, etc. In some embodiments, rather than (or in addition to) generating multiple candidate descriptions 410 and generating correspondence metrics and/or weighted correspondence metrics for each candidate description 410, the description generator 114 may generate correspondence metrics and/or weighted correspondence metrics representing the degree to which individual item attributes correspond to the individual user attributes. The description generator 114 may then generate an item description from the highest-scoring item attributes.

Example Computing Device

Figure 7:
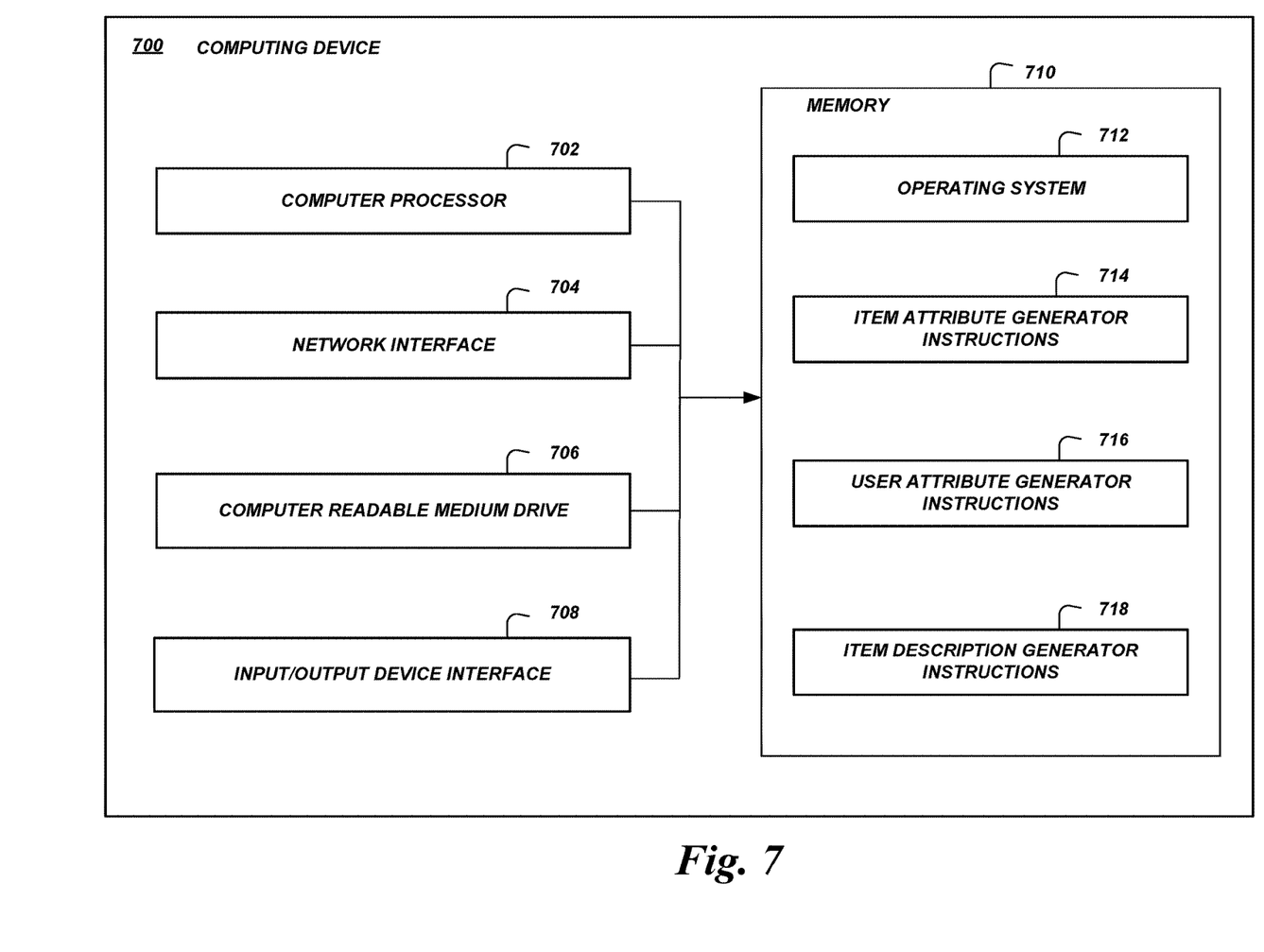
FIG. 7 is a block diagram illustrating components of a computing device configured to execute processes for dynamic content management according to some embodiments.

FIG. 7 illustrates the various components of an example computing device 700 configured to implement some or all of the functionality of the dynamic content management system 100. In some embodiments, as shown, the computing device 700 may include: one or more computer processors 702, such as physical central processing units ("CPUs"); one or more network interfaces 704, such as a network interface cards ("NICs"); one or more computer readable medium drives 706, such as a high density disks ("HDDs"), solid state drives ("SDDs"), flash drives, and/or other persistent non-transitory computer-readable media; an input/output device interface 708, such as an IO interface in communication with one or more microphones; and one or more computer readable memories 710, such as random access memory ("RAM") and/or other volatile non-transitory computer-readable media.

The computer readable memory 710 may include computer program instructions that one or more computer processors 702 execute in order to implement one or more embodiments. The computer readable memory 710 can store an operating system 712 that provides computer program instructions for use by the computer processor(s) 702 in the general administration and operation of the computing device 700. In some embodiments, the computer readable memory 710 can further include computer program instructions and other information for implementing aspects of the present disclosure. For example, in one embodiment, the computer-readable memory 710 may include item attribute generator instructions 714 for implementing features of the item attribute generator 110, user attribute generator instructions 716 for implementing features of the user attribute generator 112, and/or item description generator instructions 718 for implementing features of the item description generator 114.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   as performed by a computing system comprising one or more computer processors configured to execute specific instructions,
      obtaining a plurality of input textual descriptions of an item;
      generating item attribute data representing a plurality of attributes of the item based at least partly on an analysis of the plurality of input textual descriptions of the item;
      obtaining user profile data representing an attribute of a user profile;
      determining, based on an output domain parameter for an output textual description of the item, a target quantity of item attribute descriptions to be included in the output textual description; and
      generating the output textual description based at least partly on an analysis of the user profile data with respect to the item attribute data, wherein the output textual description includes the target quantity of item attribute descriptions, and wherein at least one of the target quantity of item attribute descriptions comprises a textual description of an attribute of the item that corresponds to the attribute of the user profile.

2. The computer-implemented method of claim 1, further comprising generating feature data using a first textual description of the plurality of textual descriptions, wherein the feature data comprises an encoded representation of at least a portion of the first textual description, wherein generating the item attribute data is based at least partly on the feature data, and wherein the item attribute data comprises one or more words, from the first textual description, associated with at least a first attribute of the item.

3. The computer-implemented method of claim 1, further comprising
   obtaining a set of values associated with the item, wherein a value of the set of values represents at least one of: a frequency with which a word occurs in textual descriptions associated with the item, or a degree of importance of the word in textual descriptions associated with the item; and
   identifying the word, in an input textual description of the plurality of input textual descriptions of the item, as being associated with the attribute of the item based at least partly on the set of values.

4. The computer-implemented method of claim 3, wherein the word is part of an n-gram, and wherein identifying the word comprises identifying the n-gram in the input textual description.

5. The computer-implemented method of claim 3, further comprising:
   obtaining a corpus of textual descriptions associated with an item category, wherein the item is assigned to the item category; and
   determining a probability distribution of occurrences of individual words in the corpus of textual descriptions, wherein the set of values represents the probability distribution.

6. The computer-implemented method of claim 1, further comprising determining the attribute of the user profile based at least partly on an interaction performed using the user profile, wherein the attribute of the user profile represents a word corresponding to the interaction.

7. The computer-implemented method of claim 1, further comprising generating a plurality of candidate output descriptions of the item using the item attribute data, wherein the plurality of candidate output descriptions includes at least a first candidate output description comprising a textual description of at least one attribute of the plurality of attributes of the item.

8. The computer-implemented method of claim 7, further comprising:
   determining a first value representing a degree to which the first candidate output description comprises one or more words corresponding to a first subset of a plurality of words associated with the user profile data, wherein the first subset is associated with a first weighting factor indicating a relative rank of the first subset;
   determining a second value representing a degree to which the first candidate output description comprises one or more words corresponding to a second subset of the plurality of words associated with the user profile data, wherein the second subset is associated with a second weighting factor indicating a relative rank of the second subset;
   determining a score using the first value, first weighting factor, second value, and the second weighting factor; and
   selecting the first candidate output description based at least partly on the score.

9. The computer-implemented method of claim 1, further comprising:
   determining a first score representing a degree to which a first attribute of the plurality of attributes of the item corresponds to at least a first subset of a plurality of words associated with the user profile data, wherein the first subset is associated with a first weighting factor indicating a relative rank of the first subset;

determining a second score representing a degree to which a second attribute of the plurality of attributes of the item corresponds to at least a second subset of the plurality of words associated with the user profile data; and selecting the first attribute based at least partly on an analysis of the first score with respect to the second score, wherein generating the output textual description comprises generating text describing the first attribute.

10. The computer-implemented method of claim 1, further comprising:

obtaining interaction data representing a plurality of content interactions performed using the user profile, wherein the plurality of content interactions comprises at least one of: a search query submission, a content request, creation of a content document, or a purchase of an item;

identifying a plurality of words using textual descriptions associated with at least a portion of the plurality of content interactions;

obtaining a document that was accessed using the user profile prior to or substantially concurrently with at least one of the plurality of content interactions;

generating scoring data for at least a portion of the plurality of words based at least partly on a textual analysis of the document; and selecting the portion of the plurality of words as an attribute of the user profile based at least partly on the scoring data.

11. The computer-implemented method of claim 1, further comprising determining a target textual length for the output textual description based at least partly on the output domain parameter, wherein generating the output textual description comprises generating a textual description of substantially the target textual length.

12. A system comprising:

computer-readable memory storing executable instructions; and one or more processors in communication with the computer-readable memory and configured by the executable instructions to at least:

obtain a plurality of input textual descriptions of an item;

generate item attribute data representing a plurality of attributes of the item based at least partly on an analysis of the plurality of input textual descriptions of the item;

obtain user profile data representing an attribute of a user profile;

determine a size parameter for an output textual description of the item based at least partly on a number of characters supported by an output format of the output textual description, wherein the size parameter comprises at least one of: a target textual length for the output textual description, or target quantity of item attribute descriptions to be included in the output textual description; and generate the output textual description based at least partly on the size parameter and an analysis of the user profile data with respect to the item attribute data, wherein the output textual description includes a textual description of at least one attribute of the item that corresponds to the attribute of the user profile.

13. The system of claim 12, wherein the one or more processors are further configured to determine an output domain parameter for the output textual description, wherein a characteristic of the output textual description satisfies the output domain parameter.

14. The system of claim 12, wherein the one or more processors are further configured to at least:

obtain a set of values associated with the item, wherein a value of the set of values represents at least one of: a frequency with which a word occurs in textual descriptions associated with the item, or a degree of importance of the word in textual descriptions associated with the item; and identify the word, in an input textual description of the plurality of input textual descriptions of the item, as being associated with the attribute of the item based at least partly on the set of values.

15. The system of claim 12, wherein the one or more processors are further configured to at least:

generate a plurality of candidate output descriptions of the item using the item attribute data, wherein the plurality of candidate output descriptions includes at least a first candidate output description comprising a textual description of at least one attribute of the plurality of attributes of the item;

determine a first value representing a degree to which the first candidate output description comprises one or more words corresponding to a first subset of a plurality of words associated with the user profile data, wherein the first subset is associated with a first weighting factor indicating a relative rank of the first subset;

determine a second value representing a degree to which the first candidate output description comprises one or more words corresponding to a second subset of the plurality of words associated with the user profile data, wherein the second subset is associated with a second weighting factor indicating a relative rank of the second subset;

determine a score using the first value, first weighting factor, second value, and the second weighting factor; and select the first candidate output description based at least partly on the score.

16. The system of claim 15, wherein the first value comprises a cosine distance between at least a portion of the first candidate output description and the first subset.

17. The system of claim 12, wherein the one or more processors are further configured to train an artificial neural network using the plurality of input textual descriptions, wherein the item attribute data is generated using the artificial neural network.

18. The system of claim 17, wherein to generate item attribute data, the artificial neural network generates data representing one or more keywords or phrases indicative of one or more attributes of the item.

19. The system of claim 18, wherein the one or more keywords or phrases correspond to attributes of the item likely to be discussed most frequently in an input textual description.

20. The system of claim 12, wherein the output textual description includes the target quantity of item attribute descriptions, and wherein at least one of the target quantity of item attribute descriptions comprises the textual description of the attribute of the item that corresponds to the attribute of the user profile.

* * * * *